UNITED STATES PATENT OFFICE.

ISAIAH L. ROBERTS AND HENRY L. BREVOORT, OF BROOKLYN, ASSIGNORS TO THE ROBERTS-BREVOORT ELECTRIC COMPANY, (LIMITED,) OF NEW YORK, N. Y.

DIAPHRAGM FOR GALVANIC BATTERIES.

SPECIFICATION forming part of Letters Patent No. 394,617, dated December 18, 1888.

Application filed May 14, 1886. Renewed October 27, 1888. Serial No. 289,341. (No specimens.)

*To all whom it may concern:*

Be it known that we, ISAIAH L. ROBERTS and HENRY L. BREVOORT, citizens of the United States, and residents of the city of Brooklyn, county of Kings, State of New York, have invented certain Improvements in Electric Batteries, of which the following is a specification.

In an application for a patent filed by us May 1, 1886, Serial No. 200,847, we have described and claimed a partition or diaphragm for electrical batteries having certain described characteristics. In said application the partition or diaphragm was set forth as being composed partially or wholly of a gelatinous or jelly-like material, which makes a non-porous substantially solid homogeneous wall whose particles, while sufficiently solid and compact to maintain their own positions, and so prevent for practical purposes any transmission of fluids through them, are yet themselves able to act as electrolytes and suffer such decompositions and recombinations as are essential to the electrolytic transmission of electric force.

The particular gelatinous or jelly-like materials mentioned in our application were to be obtained from vegetable sources.

Our present invention consists in the employment of a gelatinous or jelly-like substance obtained from albuminous materials to carry out our previous invention.

The albuminous material may be obtained from either animal or vegetable sources—such as the white of egg, for instance—and should be boiled, cooked, or otherwise treated to make the albumen of the necessary gelatinous or jelly-like character for the purpose. Some salt of an alkali or alkaline earth should be combined with the substance of the albumen in order to increase the electrolytic properties of the partition or diaphragm. If the albumen be boiled in water, for instance, the water should be made strong brine by dissolving in it table-salt, zinc sulphate, or some salt of an alkali or alkaline earth. We prefer to stir with the material a filamentous binding material—such as cotton, fur, wool, flax, or asbestus. The gelatinous or jelly-like material thus obtained may be used to form the partition or diaphragm by supporting it with a wall of cloth or between two supporting-walls of stretched textile fabric—such as loosely-woven cotton goods or the like—or in any of the ways described in our aforesaid application for patent.

We claim as our invention—

1. A diaphragm or partition for an electric battery, partially or wholly of a gelatinous or jelly-like substance obtained from albuminous materials.

2. A diaphragm or partition for an electric battery, partially or wholly of a gelatinous or jelly-like substance obtained from albuminous materials and combined with a salt, substantially as described.

ISAIAH L. ROBERTS.
HENRY L. BREVOORT.

Witnesses:
B. T. VETTERLEIN,
G. W. BORCHERS.